United States Patent
Wang et al.

(10) Patent No.: US 10,146,372 B2
(45) Date of Patent: Dec. 4, 2018

(54) METHOD FOR CONTROLLING BLANK SCREEN GESTURE PROCESSING AND TERMINAL

(71) Applicant: ZTE Corporation, Shenzhen, Guangdong (CN)

(72) Inventors: Chong Wang, Shenzhen (CN); Caiyan Yang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/511,777

(22) PCT Filed: Dec. 2, 2014

(86) PCT No.: PCT/CN2014/092825
§ 371 (c)(1),
(2) Date: Mar. 16, 2017

(87) PCT Pub. No.: WO2015/131590
PCT Pub. Date: Sep. 11, 2015

(65) Prior Publication Data
US 2017/0308243 A1    Oct. 26, 2017

(30) Foreign Application Priority Data
Sep. 19, 2014  (CN) .......................... 2014 1 0483153

(51) Int. Cl.
*G06F 3/041* (2006.01)
*G06F 3/0488* (2013.01)

(52) U.S. Cl.
CPC ........ *G06F 3/0418* (2013.01); *G06F 3/04883* (2013.01)

(58) Field of Classification Search
None
See application file for complete search history.

(56) References Cited

U.S. PATENT DOCUMENTS

| | | |
|---|---|---|
| 2011/0088086 A1 | 4/2011 | Swink |
| 2011/0130170 A1 | 6/2011 | Han |
| 2013/0174083 A1 | 7/2013 | Ting et al. |
| 2013/0326395 A1 | 12/2013 | Oh |

(Continued)

FOREIGN PATENT DOCUMENTS

| | | |
|---|---|---|
| CN | 103793175 A | 5/2014 |
| CN | 104007878 A | 8/2014 |
| WO | 2013123738 A1 | 8/2013 |

OTHER PUBLICATIONS

International Search Report in international application No. PCT/CN2014/092825, dated May 26, 2015, 2 pgs.

(Continued)

*Primary Examiner* — Nicholas Lee
(74) *Attorney, Agent, or Firm* — Cooper Legal Group, LLC

(57) ABSTRACT

A method for controlling blank screen gesture processing and a terminal are described. The method comprises: upon receiving a blank screen gesture, acquiring related information of the blank screen gesture; and determining whether the blank screen gesture is a misoperation gesture according to the acquired related information of the blank screen gesture, if the blank screen gesture is not a misoperation gesture, triggering a related operation of the blank screen gesture, and if the blank screen gesture is a misoperation gesture, making no response to the misoperation gesture.

10 Claims, 1 Drawing Sheet

---

```
                        ┌─ 100
When a blank screen gesture is received, related information of the blank
              screen gesture is acquired
                        │
                        ▼ ┌─ 101
It is determined whether the blank screen gesture is an accidentally
operated gesture according to the acquired related information of the blank
screen gesture, a related operation of the blank screen gesture is triggered
when it is not the accidentally operated gesture, and no response is made
to the accidentally operated gesture when the blank screen gesture is the
              accidentally operated gesture
```

(56) References Cited

U.S. PATENT DOCUMENTS

2014/0189604 A1   7/2014   Garrison et al.
2015/0033326 A1   1/2015   Fang
2015/0074799 A1   3/2015   Swink et al.
2015/0077377 A1   3/2015   Han et al.

OTHER PUBLICATIONS

English Translation of the Written Opinion of the International Search Authority in international application No. PCT/CN2014/092825, dated May 26, 2015, 9 pgs.
Supplementary European Search Report in European application No. 14884960.7, dated Jul. 19, 2017, 7 pgs.

METHOD FOR CONTROLLING BLANK SCREEN GESTURE PROCESSING AND TERMINAL

TECHNICAL FIELD

The disclosure relates to a mobile terminal application technology, and more particularly, to a method and a terminal for controlling blank screen gesture processing.

BACKGROUND

Along with development of a mobile communication technology, functions of mobile terminals such as mobile phones and tablets are also enhanced. For facilitating use of users, many convenient and rapid functions are developed for mobile terminals, wherein a blank screen gesture is a very representative function. The blank screen gesture refers to that a user draws some specific patterns on a screen to rapidly start a certain function of a mobile terminal without turning on the screen. For example, leftward and rightward sliding can switch a song which is being played, and upward and downward sliding can activate a camera or a certain preset application. The blank screen gesture brings convenience to the user, but also causes a problem of accidental operation of the gesture. Particularly, when the mobile terminal is placed in a pocket, a contact between the mobile terminal and a human body during movement of the human body may be mistakenly recognized as the blank screen gesture of the user, thereby starting some applications and causing influence on normal use of the user over the blank screen gesture.

At present, for the problem of accidental operation of the blank screen gesture, a main solution is adopting a method of disabling a blank screen gesture processing function, called as a "pocket mode". Whether a mobile terminal is in a pocket is determined by virtue of a distance sensor or a light sensor, then the mobile terminal automatically enters the "pocket mode", and then the problem of mistaken triggering is accordingly solved. However, the method not only requires support of new hardware (the sensor), but also inevitably brings a problem of power consumption, and is unfavourable for solving the problem of accidental operation of the blank screen gesture for the mobile terminal.

SUMMARY

In view of this, embodiments of the disclosure provide a method and a terminal for controlling blank screen gesture processing, which can simply solve a problem of accidental operation of a blank screen gesture on the premise of no additional hardware support.

To this end, an embodiment of the disclosure provides a method for controlling blank screen gesture processing, which includes that:

when a blank screen gesture is received, related information of the blank screen gesture is acquired; and whether the blank screen gesture is an accidentally operated gesture is determined according to the acquired related information of the blank screen gesture, a related operation of the blank screen gesture is triggered when it is not the accidentally operated gesture, and no response is made to the accidentally operated gesture when the blank screen gesture is the accidentally operated gesture.

Alternatively, the related information of the blank screen gesture may include:

a touch input area, a touch input shape, a touch input length, a touch input slope, a touch input speed and a touch input time.

Alternatively, the step of determining whether the blank screen gesture is the accidentally operated gesture may include that:

determining whether the touch input area meets a preset requirement, if YES, continuing to determine whether the touch input shape meets a preset input shape, and if NO, determining that the blank screen gesture is the accidentally operated gesture;

when the touch input shape meets the preset input shape, continuing to determine whether the touch input length meets a preset length requirement; when the touch input shape does not meet the preset input shape, determining that the blank screen gesture is the accidentally operated gesture;

when the touch input length meets the preset length requirement, continuing to determine whether the touch input slope meets a preset slope requirement; if NO, determining that the blank screen gesture is the accidentally operated gesture;

when the touch input slope meets the preset slope requirement, continuing to determine whether the touch input speed meets a preset speed requirement; when the touch input length does not meet the preset length requirement, determining that the blank screen gesture is the accidentally operated gesture;

when the touch input speed meets the preset speed requirement, continuing to determine whether the touch input time meets a preset time requirement; when the touch input speed does not meet the preset speed requirement, determining that the blank screen gesture is the accidentally operated gesture; and when the touch input time meets the preset time requirement, determining that the blank screen gesture is not the accidentally operated gesture, and when the touch input time does not meet the preset time requirement, determining that the blank screen gesture is the accidentally operated gesture.

Alternatively, before determining whether the touch input time meets the preset time requirement, the method may further include that: a latest time when determining whether the blank screen gesture is the accidentally operated gesture is recorded.

Alternatively, the step of determining whether the touch input time meets the preset time requirement may include that:

a current input time of the blank screen gesture is compared with the latest time when determining whether the blank screen gesture is the accidentally operated gesture, it is determined that the blank screen gesture does not meet the preset time requirement when a time difference is smaller than a preset time length, and it is determined that the blank screen gesture meets the preset time requirement when the time difference is greater than or equal to the preset time length.

An embodiment of the disclosure further provides a terminal for controlling blank screen gesture processing, which includes: an acquisition unit and a determination processing unit, wherein the acquisition unit is arranged to, when a blank screen gesture is received, acquire related information of the blank screen gesture; and the determination processing unit comprises a determination module and a processing module, wherein the determination module is arranged to determine whether the blank screen gesture is an accidentally operated gesture according to the acquired related information of the blank screen gesture; and the processing module is arranged to, when the determination module determines that the blank screen gesture is not the accidentally operated gesture, trigger a related operation of the blank screen gesture, and when the determination module determines that the blank screen gesture is the accidentally operated gesture, make no response to the accidentally operated gesture.

Alternatively, the acquisition unit may be arranged to:

when the blank screen gesture is received, acquire a touch input area, a touch input shape, a touch input length, a touch input slope, a touch input speed and a touch input time of the blank screen gesture.

Alternatively, the determination module may be arranged to:

determine whether the touch input area meets a preset requirement, if YES, continue to determine whether the touch input shape meets a preset input shape, and if NO, determine that the blank screen gesture is the accidentally operated gesture;

when the touch input shape meets the preset input shape, continue to determine whether the touch input length meets a preset length requirement, and when the touch input shape does not meet the preset input shape, determine that the blank screen gesture is the accidentally operated gesture;

when the touch input length meets the preset length requirement, continue to determine whether the touch input slope meets a preset slope requirement, and if NO, determine that the blank screen gesture is the accidentally operated gesture;

when the touch input slope meets the preset slope requirement, continue to determine whether the touch input speed meets a preset speed requirement, and when the touch input length does not meet the preset length requirement, determine that the blank screen gesture is the accidentally operated gesture;

when the touch input speed meets the preset speed requirement, continue to determine whether the touch input time meets a preset time requirement, and when the touch input speed does not meet the preset speed requirement, determine that the blank screen gesture is the accidentally operated gesture; and when the touch input time meets the preset time requirement, determine that the blank screen gesture is not the accidentally operated gesture, and when the touch input time does not meet the preset time requirement, determine that the blank screen gesture is the accidentally operated gesture.

Alternatively, the determination module may further be arranged to, before determining whether the touch input time meets the preset time requirement, record a latest time when determining whether the blank screen gesture is the accidentally operated gesture.

Alternatively, the determination module may be arranged to determine whether the touch input time meets the preset time requirement as follows:

a current input time of the blank screen gesture is compared with the latest time when determining whether the blank screen gesture is the accidentally operated gesture, it is determined that the blank screen gesture does not meet the preset time requirement when a time difference is smaller than a preset time length, and it is determined that the blank screen gesture meets the preset time requirement when the time difference is greater than or equal to the preset time length.

An embodiment of the disclosure further provides a computer program, which includes a program instruction, the program instruction being executed by a terminal to enable the terminal to execute the abovementioned method.

An embodiment of the disclosure further provides a computer-readable storage medium including the computer program.

According to the embodiments of the disclosure, no hardware is required to be added to a mobile terminal, the related information of the blank screen gesture is acquired, and no response is made when it is determined that the blank screen gesture is the accidentally operated gesture, so that accidental operation in the blank screen gesture is effectively determined and processed, and user experience in the blank screen gesture are improved.

BRIEF DESCRIPTION OF THE DRAWINGS

The drawings are adopted to provide a further understanding to the technical solutions of the disclosure, form a part of the specification, and are adopted to explain the technical solutions of the disclosure together with the embodiments of the disclosure and not intended to form limits to the technical solutions of the disclosure.

DETAILED DESCRIPTION

The embodiments of the disclosure will be described below with reference to the drawings in detail. It is important to note that the embodiments in the disclosure and characteristics in the embodiments may be freely combined under the condition of no conflicts.

Figure 1:
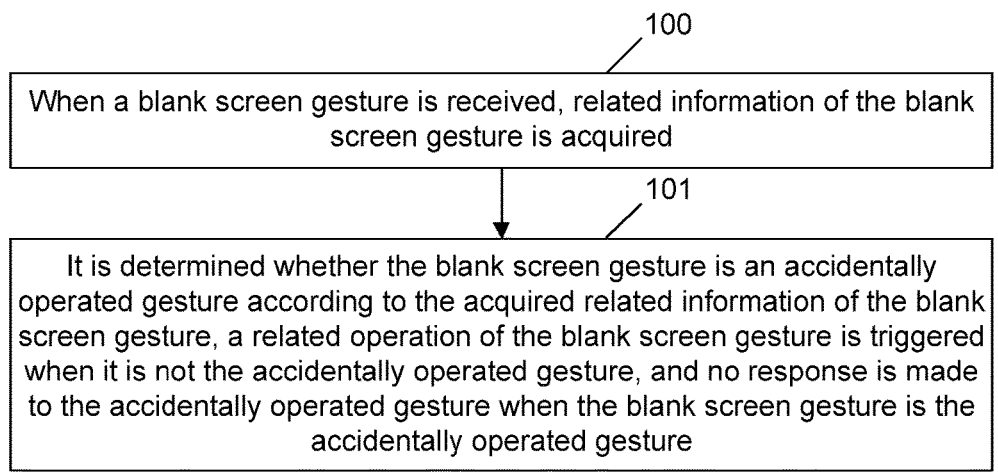
FIG. 1 is a flow chart of a method for controlling blank screen gesture processing according to an embodiment of the disclosure.

FIG. 1 is a flow chart of a method for controlling blank screen gesture processing according to an embodiment of the disclosure. As shown in FIG. 1, the method includes the following steps.

Step 100: when a blank screen gesture is received, related information of the blank screen gesture is acquired.

In this step, the related information of the blank screen gesture may include: a touch input area, a touch input shape, a touch input length, a touch input slope, a touch input speed and a touch input time.

It is important to note that acquisition of the related information of the blank screen gesture may be implemented by detecting absolute and relative positions of position coordinates of key points by a touch screen. For example, 1:the touch input area: the touch screen may detect a multipoint touch and calculate an area of a polygon formed by multiple points through the detected multipoint touch; 2:the touch input shape: in a touch input process, the touch screen may sample touch input points according to a certain time interval, calculate and isometrically match a distance between every two sampling points and a preset distance, and recognize a preset shape (which is usually an English letter) in case of successful matching; the touch input length: the touch screen may acquire a starting point and an ending point in a horizontal direction and a perpendicular direction during the touch, calculate distances between the starting point and ending point in the horizontal direction and the perpendicular direction, and determine the greater distance as the touch input length; the touch input slope: an angle between the starting point and ending point in the horizontal direction and the perpendicular direction is determined as touch input slope; the touch input speed: a number of points input within a unit time in the touch input process is calculated as the touch input speed; and the touch input time: a time, recorded by the touch screen, for finishing complete touch input.

Step 101: it is determined whether the blank screen gesture is an accidentally operated gesture according to the acquired related information of the blank screen gesture, a related operation of the blank screen gesture is triggered when it is not the accidentally operated gesture, and no response is made to the accidentally operated gesture when the blank screen gesture is the accidentally operated gesture.

In this step, the step of determining whether the blank screen gesture is the accidentally operated gesture includes that:

it is determined whether the touch input area meets a preset requirement, if YES, whether the touch input shape meets a preset input shape is continued to be determined otherwise, it is determined that the blank screen gesture is the accidentally operated gesture;

when the touch input shape meets the preset input shape, whether the touch input length meets a preset length requirement is continued to be determined; when the touch input shape does not meet the preset input shape, it is determined that the blank screen gesture is the accidentally operated gesture;

when the touch input length meets the preset length requirement, whether the touch input slope meets a preset slope requirement is continued to be determined; if NO, it is determined that the blank screen gesture is the accidentally operated gesture;

when the touch input slope meets the preset slope requirement, whether the touch input speed meets a preset speed requirement is continued to be determined; when the touch input length does not meet the preset length requirement, it is determined that the blank screen gesture is the accidentally operated gesture;

when the touch input speed meets the preset speed requirement, whether the touch input time meets a preset time requirement is continued to be determined; when the touch input speed does not meet the preset speed requirement, it is determined that the blank screen gesture is the accidentally operated gesture; and when the touch input time meets the preset time requirement, it is determined that the blank screen gesture is not the accidentally operated gesture; when the touch input time does not meet the preset time requirement, it is determined that the blank screen gesture is the accidentally operated gesture.

It is important to note that the preset requirements may be set according to experiences of those skilled in the art. The preset input shape may be a letter o, e, s, v and the like; the preset length requirement is that the distances between the starting points and the ending points are determined as effective distances only when exceeding ¾ of the screen; the preset speed requirement is that the complete touch input is required to be completed within 100 milliseconds; and the preset slope requirement is that included angle between the starting point and the ending point in the horizontal direction and the perpendicular direction is smaller than 5 degrees. Touch input not meeting the limiting conditions is considered as ineffective input.

Before whether the touch input time meets the preset time requirement is determined, a latest time when whether the blank screen gesture is an accidentally operated gesture is determined may further be recorded.

Alternatively, the step of determining whether the touch input time meets the preset time requirement may include that:

a current input time of the blank screen gesture is compared with the latest time when determining whether the blank screen gesture is the accidentally operated gesture, it is determined that the blank screen gesture does not meet the preset time requirement when a time difference is smaller than a preset time length, and it is determined that the blank screen gesture meets the preset time requirement when the time difference is greater than or equal to the preset time length.

It is important to note that the preset time length may be a numerical value obtained by those skilled in the art according to empirical statistics. For example, the preset time length may be set to be 500 milliseconds.

Figure 2:
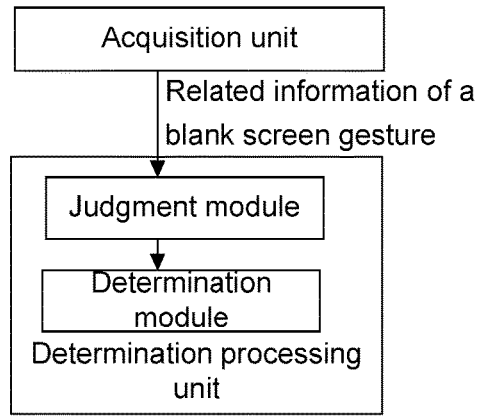
FIG. 2 is a structure block diagram of a terminal for controlling blank screen gesture processing according to an embodiment of the disclosure.

FIG. 2 is a structure block diagram of a terminal for controlling blank screen gesture processing according to an embodiment of the disclosure. As shown in FIG. 2, the terminal includes: an acquisition unit and a determination processing unit, wherein the acquisition unit is arranged to, when a blank screen gesture is received, acquire related information of the blank screen gesture.

The acquisition unit may be arranged to, when the blank screen gesture is received, acquire a touch input area, a touch input shape, a touch input length, a touch input slope, a touch input speed and a touch input time of the blank screen gesture.

The determination processing unit includes a determination module and a processing module, wherein the determination module is arranged to determine whether the blank screen gesture is an accidentally operated gesture according to the acquired related information of the blank screen gesture.

The determination module is arranged to:

determine whether the touch input area meets a preset requirement, continue determining whether the touch input shape meets a preset input shape if YES, and if NO, determine that the blank screen gesture is the accidentally operated gesture;

when the touch input shape meets the preset input shape, continue determining whether the touch input length meets a preset length requirement, and when the touch input shape does not meet the preset input shape, determine that the blank screen gesture is the accidentally operated gesture;

when the touch input length meets the preset length requirement, continue determining whether the touch input slope meets a preset slope requirement, and if NO, determine that the blank screen gesture is the accidentally operated gesture;

when the touch input slope meets the preset slope requirement, continue determining whether the touch input speed meets a preset speed requirement, and when the touch input length does not meet the preset length requirement, determine that the blank screen gesture is the accidentally operated gesture;

when the touch input speed meets the preset speed requirement, continue determining whether the touch input time meets a preset time requirement, and when the touch input speed does not meet the preset speed requirement, determine that the blank screen gesture is the accidentally operated gesture; and when the touch input time meets the preset time requirement, determine that the blank screen gesture is not the accidentally operated gesture, and when the touch input time does not meet the preset time requirement, determine that the blank screen gesture is the accidentally operated gesture.

The determination module is further arranged to, before determining whether the touch input time meets the preset time requirement, record a latest time when determining whether the blank screen gesture is an accidentally operated gesture.

Herein, when the touch input speed meets the preset speed requirement, a current input time of the blank screen gesture is compared with the latest time when determining whether the blank screen gesture is the accidentally operated gesture, it is determined that the blank screen gesture does not meet the preset time requirement when a time difference is smaller than a preset time length, and it is determined that the blank screen gesture meets the preset time requirement when the time difference is greater than or equal to the preset time length.

The processing module is arranged to, when the determination module determines that the blank screen gesture is not the accidentally operated gesture, trigger a related operation of the blank screen gesture, and when the determination module determines that the blank screen gesture is the accidentally operated gesture, make no response to the accidentally operated gesture.

Those skilled in the art should know that all or part of the steps of the abovementioned embodiments may be implemented by virtue of a flow of a computer program, the computer program may be stored in a computer-readable storage medium, the computer program is executed on a corresponding hardware platform (such as a system, equipment, a device and an apparatus), and during execution, one or combination of the steps of the method embodiment is included.

Alternatively, all or part of the steps of the abovementioned embodiment may also be implemented by virtue of an integrated circuit, these steps may form multiple integrated circuit modules, or multiple modules or steps therein may form a single integrated circuit module for implementation. Therefore, the disclosure is not limited to any specific hardware and software combination.

Each device, function module, and/or function unit in the abovementioned embodiments may be implemented by adopting a universal computing device, and they may be concentrated on a single computing device, and may also be distributed on a network formed by multiple computing devices.

When being implemented in form of software function module and sold or used as an independent product, each device, function module, and/or function unit in the abovementioned embodiments may be stored in a computer-readable storage medium. The abovementioned computer-readable storage medium may be a read-only memory, a magnetic disk, an optical disk or the like.

INDUSTRIAL APPLICABILITY

According to the embodiments of the disclosure, accidental operation of the blank screen gesture is effectively determined and processed, and user experience in the blank screen gesture are improved.

What is claimed is:
1. A method for controlling blank screen gesture processing, comprising:
   when a blank screen gesture is received, acquiring related information of the blank screen gesture; and
   determining whether the blank screen gesture is an accidentally operated gesture according to the related information of the blank screen gesture, triggering a related operation of the blank screen gesture when it is not the accidentally operated gesture, and making no response to the accidentally operated gesture when the blank screen gesture is the accidentally operated gesture;
   wherein the related information of the blank screen gesture comprises: a touch input area, a touch input shape, a touch input length, a touch input slope, a touch input speed and a touch input time;
   wherein the step of determining whether the blank screen gesture is the accidentally operated gesture comprises:
      determining whether the touch input area meets a preset requirement, if YES, continuing to determine whether the touch input shape meets a preset input shape, and if NO, determining that the blank screen gesture is the accidentally operated gesture;
      when the touch input shape meets the preset input shape, continuing to determine whether the touch input length meets a preset length requirement, and when the touch input shape does not meet the preset input shape, determining that the blank screen gesture is the accidentally operated gesture;
      when the touch input length meets the preset length requirement, continuing to determine whether the touch input slope meets a preset slope requirement, and if NO, determining that the blank screen gesture is the accidentally operated gesture;
      when the touch input slope meets the preset slope requirement, continuing to determine whether the touch input speed meets a preset speed requirement, and when the touch input length does not meet the preset length requirement, determining that the blank screen gesture is the accidentally operated gesture;
      when the touch input speed meets the preset speed requirement, continuing to determine whether the touch input time meets a preset time requirement, and when the touch input speed does not meet the preset speed requirement, determining that the blank screen gesture is the accidentally operated gesture; and
      when the touch input time meets the preset time requirement, determining that the blank screen gesture is not the accidentally operated gesture, and when the touch input time does not meet the preset time requirement, determining that the blank screen gesture is the accidentally operated gesture.

2. The method according to claim 1, further comprising: before determining whether the touch input time meets the preset time requirement, recording a latest time when determining whether the blank screen gesture is the accidentally operated gesture.

3. The method according to claim 2, wherein the step of determining whether the touch input time meets the preset time requirement comprises:
   comparing a current input time of the blank screen gesture with the latest time when determining whether the blank screen gesture is the accidentally operated gesture, determining that the touch input time of the blank screen gesture does not meet the preset time requirement when a time difference is smaller than a preset time length, and determining that the touch input time of the blank screen gesture meets the preset time requirement when the time difference is greater than or equal to the preset time length.

4. A terminal for controlling blank screen gesture processing, comprising an acquisition unit and a determination processing unit, wherein
the acquisition unit is arranged to, when a blank screen gesture is received, acquire related information of the blank screen gesture; and
the determination processing unit comprises a determination module and a processing module, wherein
the determination module is arranged to determine whether the blank screen gesture is an accidentally operated gesture according to the related information of the blank screen gesture; and
the processing module is arranged to, when the determination module determines that the blank screen gesture is not the accidentally operated gesture, trigger a related operation of the blank screen gesture, and when the determination module determines that the blank screen gesture is the accidentally operated gesture, make no response to the accidentally operated gesture;
wherein the acquisition unit is arranged to: when the blank screen gesture is received, acquire a touch input area, a touch input shape, a touch input length, a touch input slope, a touch input speed and a touch input time of the blank screen gesture;
wherein the determination module is arranged to:
determine whether the touch input area meets a preset requirement, if YES, continue to determine whether the touch input shape meets a preset input shape, and if NO, determine that the blank screen gesture is the accidentally operated gesture;
when the touch input shape meets the preset input shape, continue to determine whether the touch input length meets a preset length requirement, and when the touch input shape does not meet the preset input shape, determine that the blank screen gesture is the accidentally operated gesture;
when the touch input length meets the preset length requirement, continue to determine whether the touch input slope meets a preset slope requirement, and if NO, determine that the blank screen gesture is the accidentally operated gesture;
when the touch input slope meets the preset slope requirement, continue to determine whether the touch input speed meets a preset speed requirement, and when the touch input length does not meet the preset length requirement, determine that the blank screen gesture is the accidentally operated gesture;
when the touch input speed meets the preset speed requirement, continue to determine whether the touch input time meets a preset time requirement, and when the touch input speed does not meet the preset speed requirement, determine that the blank screen gesture is the accidentally operated gesture; and
when the touch input time meets the preset time requirement, determine that the blank screen gesture is not the accidentally operated gesture, and when the touch input time does not meet the preset time requirement, determine that the blank screen gesture is the accidentally operated gesture.

5. The terminal according to claim 4, wherein the determination module is further arranged to, before determining whether the touch input time meets the preset time requirement, record a latest time when determining whether the blank screen gesture is the accidentally operated gesture.

6. The terminal according to claim 5, wherein the determination module is arranged to determine whether the touch input time meets the preset time requirement as follows:
a current input time of the blank screen gesture is compared with the latest time when determining whether the blank screen gesture is the accidentally operated gesture, it is determined that the touch input time of the blank screen gesture does not meet the preset time requirement when a time difference is smaller than a preset time length, and it is determined that the touch input time of the blank screen gesture meets the preset time requirement when the time difference is greater than or equal to the preset time length.

7. A non-transitory computer-readable storage medium having stored therein instructions that, when executed by a processor of a terminal, causes the terminal to perform a method for controlling blank screen gesture processing, comprising:
when a blank screen gesture is received, acquiring related information of the blank screen gesture; and
determining whether the blank screen gesture is an accidentally operated gesture according to the related information of the blank screen gesture, triggering a related operation of the blank screen gesture when it is not the accidentally operated gesture, and making no response to the accidentally operated gesture when the blank screen gesture is the accidentally operated gesture;
wherein the related information of the blank screen gesture comprises: a touch input area, a touch input shape, a touch input length, a touch input slope, a touch input speed and a touch input time;
wherein the step of determining whether the blank screen gesture is the accidentally operated gesture comprises:
determining whether the touch input area meets a preset requirement, if YES, continuing to determine whether the touch input shape meets a preset input shape, and if NO, determining that the blank screen gesture is the accidentally operated gesture;
when the touch input shape meets the preset input shape, continuing to determine whether the touch input length meets a preset length requirement, and when the touch input shape does not meet the preset input shape, determining that the blank screen gesture is the accidentally operated gesture;
when the touch input length meets the preset length requirement, continuing to determine whether the touch input slope meets a preset slope requirement, and if NO, determining that the blank screen gesture is the accidentally operated gesture;
when the touch input slope meets the preset slope requirement, continuing to determine whether the touch input speed meets a preset speed requirement, and when the touch input length does not meet the preset length requirement, determining that the blank screen gesture is the accidentally operated gesture;
when the touch input speed meets the preset speed requirement, continuing to determine whether the touch input time meets a preset time requirement, and when the touch input speed does not meet the preset speed requirement, determining that the blank screen gesture is the accidentally operated gesture; and
when the touch input time meets the preset time requirement, determining that the blank screen gesture is not the accidentally operated gesture, and when the touch input time does not meet the preset time requirement, determining that the blank screen gesture is the accidentally operated gesture.

8. The non-transitory computer-readable storage medium according to claim 7, further comprising: before determining whether the touch input time meets the preset time requirement, recording a latest time when determining whether the blank screen gesture is the accidentally operated gesture.

9. The non-transitory computer-readable storage medium according to claim 8, wherein the step of determining whether the touch input time meets the preset time requirement comprises:

comparing a current input time of the blank screen gesture with the latest time when determining whether the blank screen gesture is the accidentally operated gesture, determining that the touch input time of the blank screen gesture does not meet the preset time requirement when a time difference is smaller than a preset time length, and determining that the touch input time of the blank screen gesture meets the preset time requirement when the time difference is greater than or equal to the preset time length.

10. The method according to claim 1, wherein the blank screen gesture refers to some specific patterns drawn on a screen to rapidly start a function of a mobile terminal without turning on the screen.

\* \* \* \* \*